(12) United States Patent  (10) Patent No.: US 8,238,833 B1
Mehmood et al.  (45) Date of Patent: Aug. 7, 2012

(54) SYSTEM AND METHOD FOR AUTOMATING NETWORK DEVICE OPERABILITY TESTING

(75) Inventors: Arsalan Mehmood, Arlington, VA (US); Joseph Zangara, Haymarket, VA (US); Nathan Klonoski, Reston, VA (US)

(73) Assignee: Nextel Communications, Inc., Reston, VA (US)

( * ) Notice: Subject to any disclaimer, the term of this patent is extended or adjusted under 35 U.S.C. 154(b) by 1524 days.

(21) Appl. No.: 11/697,233

(22) Filed: Apr. 5, 2007

(51) Int. Cl.
*H04B 17/00* (2006.01)
(52) U.S. Cl. ............... 455/67.11; 455/67.14; 455/424; 455/457; 370/231; 370/246; 370/242; 370/243; 370/235; 702/117; 714/4.12; 714/25; 379/29.01; 701/29
(58) Field of Classification Search .......... 455/424, 455/67.11, 67.14; 370/231, 246; 702/117; 714/4.12
See application file for complete search history.

(56) References Cited

U.S. PATENT DOCUMENTS

| 6,034,948 A * | 3/2000 | Nakamura et al. ............ 370/246 |
| 6,757,521 B1 * | 6/2004 | Ying ............................ 455/67.11 |
| 7,010,295 B1 * | 3/2006 | Zerlan et al. ................... 455/424 |
| 7,203,616 B2 * | 4/2007 | Mok .............................. 702/117 |
| 7,222,255 B1 * | 5/2007 | Claessens et al. ............ 714/4.12 |
| 7,808,902 B1 * | 10/2010 | Pham et al. ................. 370/231 |
| 2004/0214564 A1 | 10/2004 | Rosen et al. |

* cited by examiner

*Primary Examiner* — April G Gonzales

(57) ABSTRACT

Network device operability testing is performed by defining a universe of possible device states as a combination of network coverages, available network services and possible subscriber features. In one embodiment, each individual combination of network coverage, for a particular service and feature collectively defines a particular device state for operability testing purposes. In one embodiment, test point data may be generated, where each test point corresponds to the device's operability for a particular device state. In another embodiment, state transitions and test point data may be represented as a node-based device state tree, which may navigated for pinpointing the nature and cause of device operability failures.

31 Claims, 8 Drawing Sheets

SYSTEM AND METHOD FOR AUTOMATING NETWORK DEVICE OPERABILITY TESTING

FIELD OF THE INVENTION

The present invention relates generally to network device testing, and more particularly to systems and methods for automating network device operability testing for specific device features across different network coverages and corresponding network services.

BACKGROUND OF THE INVENTION

Wireless communications systems offer a variety of services to subscribers such as interconnect calling, short message service (SMS), packet data communications and dispatch communications. Many wireless communications systems facilitate communications between a wireless application server and a client application resident on the wireless subscriber unit. For example, dispatch services (also known as "push-to-talk" or "walkie-talkie" services) are currently offered as an Internet protocol (IP) application served by a dispatch server.

More recently, the introduction of the dual-mode handset has made it necessary to revamp traditional device testing procedures in order to simulate stressful real-life network interactions with concurrent testing of different network conditions. With overlapping network coverages, two modems and mixed services within a single handset, it becomes increasingly difficult, if not impossible, for a test team to envision the entire scope of testing that needs to be performed for accurate device certification.

As wireless devices gain in complexity through the addition of capabilities to interact with multiple networks under varying coverage conditions, the need arises for a comprehensive system for testing and otherwise certifying the operability of such devices. To that end, the following disclosure relates to a system and method for automating network device operability testing.

SUMMARY OF THE INVENTION

Disclosed and claimed herein are systems and methods for automating network device operability testing. In one embodiment, a method for network device operability testing includes establishing a device profile for a network device, determining a coverage combination, a service combination and a feature combination for the network device based on the device profile, and then identifying a plurality of possible device states corresponding to the coverage, service and feature combinations. The method further includes generating test point data for each of the plurality of possible device states.

In addition thereto, another embodiment of a method for network device operability testing further includes defining a plurality of state transitions for the plurality of possible device states, wherein each of the plurality of state transitions is representative of the network device moving from one device state to an adjacent device state. The method further includes generating a node-based device state tree comprising a plurality of nodes connected graphically by a plurality of node links, wherein the plurality of nodes correspond to the plurality of possible device states, and the plurality of node links correspond to the plurality of state transitions.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

Disclosure Overview and Terminology

Figure 1A:
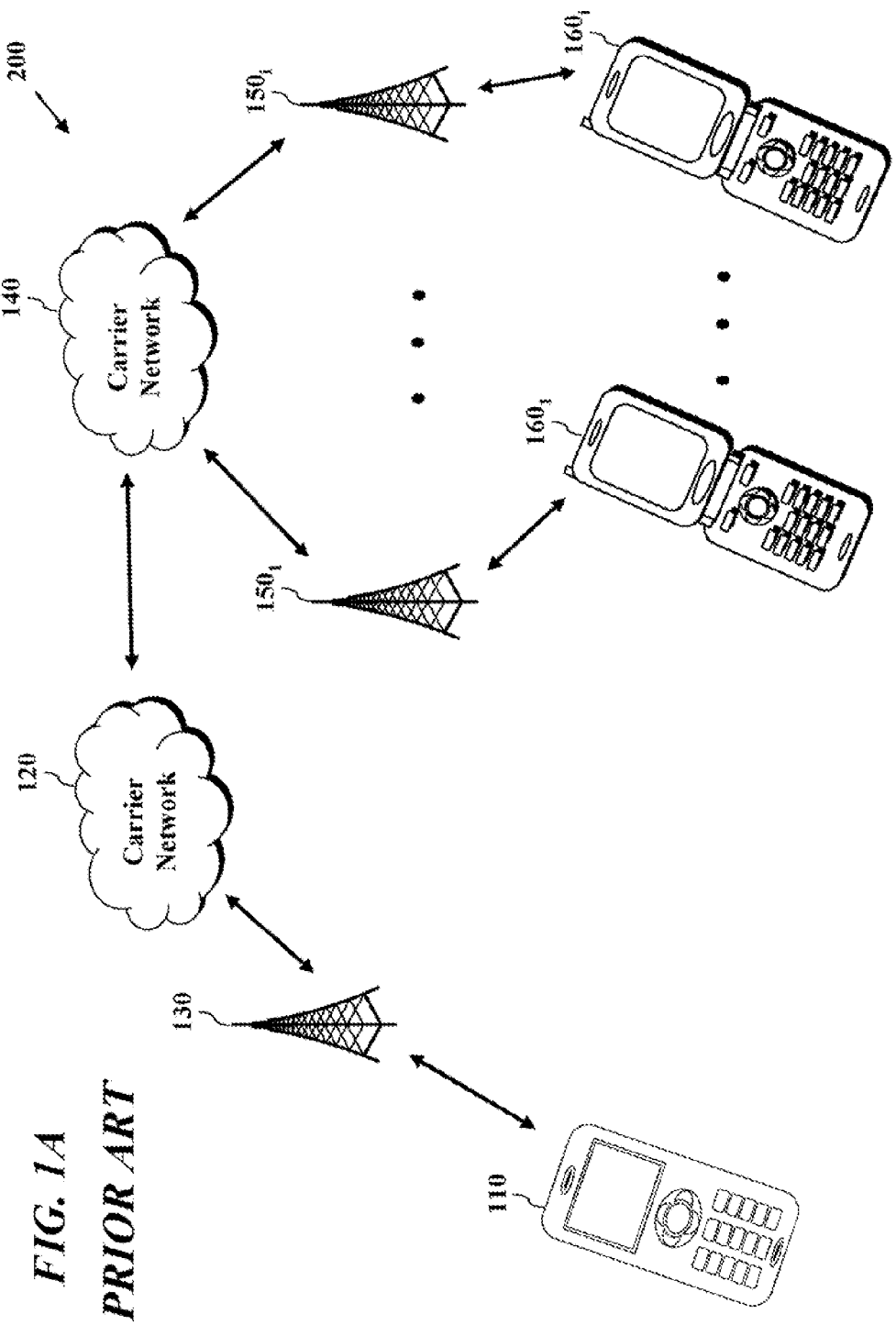
FIG. 1A is a block diagram illustrating a typical network architecture for which network device operability may be tested in accordance with the principles of the invention.

One aspect of the invention is to provide a new methodology for network device testing. This methodology effectively and efficiently defines the universe of all possible device states as a combination of all types of network coverages, all available network services and all possible subscriber features. As will be described in more detail herein, the term 'network coverage' may refer to any of the various types of network wireless coverage types, including 850, 900, 1800 and 1900 MHz Global System for Mobile Communications (GSM), Time Division Multiple Access Code (TDMA), Code Division Multiple Access (CDMA), iDEN and so on. It should further be appreciated that network coverage may further be provided by so-called network overlays, such as Evolution Data-Optimized (EVDO), Universal Mobile Telecommunications System (UMTS) Worldwide Interoperability for Microwave Access (WiMAX) and High-Speed Downlink Packet Access (HSDPA).

The term 'network services,' as used in the general methodology described herein, refers to any type of network service, including but not limited to telephony services, mobility management events, emergency/non-emergency location-based services, push-to-talk, Java™ and non-Java™ based games, selective dynamic group calling, streaming media, over-the-air software and firmware updates, desktop synchronization, etc. Similarly, 'device features' will generally refer to device-side applications which provide specific features to the subscriber, including but not limited to browser applications, chat clients, email clients, Java™, personal information management applications, media player/downloader, pictures and video capture, and phone-as-modem client, etc. It should of course be appreciated that many of the aforementioned network services are effectuated in combination with client-side features or applications, such as the previously-mentioned emergency/non-emergency location-based services, push-to-talk, Java™ and non-Java™ based games, selective dynamic group calling, streaming media, over-the-air software and firmware updates and desktop synchronization. By thinking of device operability testing in terms of these three components, a systematic device testing methodology is made possible, as further described in detail below.

Each individual combination of network coverage, for a particular service and feature collectively defines a particular "device state." Once a subject device has been appropriately defined in terms of individual network coverage, services, and features, it then becomes possible to perform a comprehensive operability test of the network device in each of the possible device states, as well as operability testing as the network device transitions from one state to another. To that end, another aspect of the invention is to generate so-called "test point data," where each test point generated corresponds to the device's operability for a particular device state. In another embodiment, operation procedures or instructions may similarly be generated indicating how to place the subject device into each such device state.

Depending on the number of possible types of network coverage, services and features, the total number of test points may easily reach into the millions. To that end, another aspect of the invention is to provide test point filtering functionality based on a user-defined test scope.

Still another aspect of the invention is to define state transitions for the test point data. That is, the operability of the device as it transitions from one state to another state (e.g., an adjacent state) may itself be tested to ensure complete and seamless device operability. This form of operability testing may be referred to herein as "transition operability testing," in contrast to device testing in a particular state, which may be referred to as "static operability testing."

In certain embodiments, the invention may further include the representation of both status operability testing as well as transition operability testing in a node-based device state tree. In one embodiment, the node-based device state tree may be comprised of a plurality of nodes connected graphically by a plurality of node links, wherein the plurality of nodes correspond to the select set of test points, and the plurality of node links correspond to the plurality of state transitions. Since test point data underlying adjacent nodes may have only one degree of freedom (e.g., only one primary is changing), a user may efficiently pinpoint the exact nature and cause of any device operability failure. Moreover, since the nodes links correspond to transition operability, any failures associated with the network device moving between states will similarly be easily detectable.

The following disclosure makes reference to network device operability test, where such network devices include, but are certainly not limited to such devices as cellular telephone, cellular-capable personal digital assistants (PDA) and similar cellular-capable devices. However, it should be appreciated that the invention may be equally applicable whenever overlaying communication technologies are used. For instance anytime a device needs to perform transactions (voice/data/video conferencing/Push-to-Talk) on multiple networks using multiple technologies, the teachings of the present disclosure may be used to create a list of all possible permutations/states that the device may experience. Similarly, the process of developing a new piece of network hardware (server/gateway/router) which connects to otherwise interacts with multiple technologies and interfaces may similarly benefit from the invention.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium or transmitted by a computer data signal. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc.

EXEMPLARY EMBODIMENTS OF THE INVENTION

FIG. 1 illustrates a block diagram of a typical communication system 100 for which network device operability may be tested in accordance with the principles of the invention. In one embodiment, the communication system 100 serves a subject network device 110 which may communicate with its carrier network 120 via a local base station 130. It should be appreciated that the subject network device 110 may include a cellular telephone, or a cellular-capable personal digital assistant (PDA), or any similar cellular-capable device. It should be appreciated that the subject network device 110 may be capable of dispatch calling, interconnect calling, roaming, message mail and/or data communications. Dispatch communication signalling can be provided using session initiation protocol (SIP) and media can be transported using real-time protocol (RTP), both of which can be carried in Internet Protocol (IP) packets.

Carrier network 120 may be configured to provide a myriad of network services, including but certainly not limited to the exemplary network services described above. In addition, the subject network device 110 may be equipped to provide numerous features to its user in connection with the various network services which may be available at any given time. As previously mentioned, such device features may include browser applications, chat clients, email clients, Java, personal information management applications and so on.

Continuing to refer to FIG. 1A, subject network device 110 is intended to be able to communicate with target devices $160_1$-$160_i$. In certain embodiments, target devices $160_1$-$160_i$ may be connected to a different carrier network 140 and serviced by separate base stations $150_1$-$150_i$. Moreover, as subject network device 110 moves from having network coverage from carrier network 120 to a different carrier network (e.g., carrier network 140), the available network services may similarly change and, in turn, the available device features may change. In short, the number of different states in which the subject network device 110 may find itself can range dramatically. As such, before network carriers will typically certify any network device for use, such device have to undergo rigorous operability testing. However, heretofore there has been no systematic methodology for providing comprehensive testing of network devices across all the various device states.

Figure 1B:
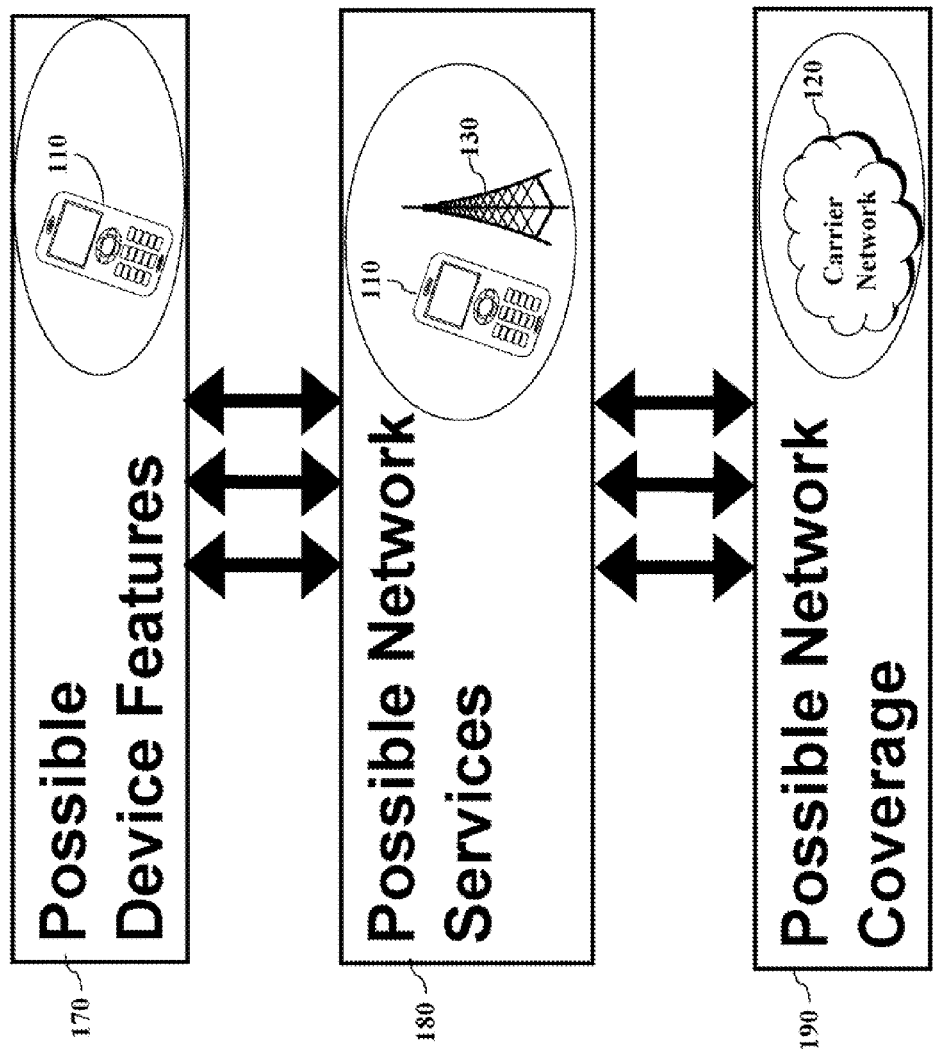
FIG. 1B is three facets of network device operability testing in accordance with one embodiment of the invention.

To that end, FIG. 1B depicts an exemplary operability testing architecture in which operability testing is defined within a rubric comprised of a set of all possible device features 170, a set of possible network services 180 and a set of possible network coverages 190. In one embodiment, the set of device features 170 is the universe of functions network devices of all types may perform by interacting with available network services 180. Similarly, the set of network services 180 is the universe of services that may be provided based on different types of network coverage, where possible types of network coverage comprise the set of possible network coverages 190. In certain embodiments, the network coverages may comprise networks which involve dual camping, or so-called network overlays, wherein each individual network component of the network overlay requires its own operability testing. As previously mentioned, examples of such network overlays may include EVDO, UMTS, WiMAX, HSDPA, etc.

However, the subject network device 110 may only be capable of a subset of the set of all possible device features 170. Similarly, the network services and coverages of interest may only include some of the possible set of services 180 and/or coverage 190. To that end, one aspect of the invention is to improve network device operability testing by defining the testing parameters based on a device profile of the subject network device 110. For example, if the subject network device 110 is a CDMA-only device, it may be desirable to exclude GSM coverages in the testing process. In addition, certain network coverages may simply be incompatible with other network coverages. Such incompatible coverages are known as exclusions. Thus, the final list of network coverages to be tested may include those coverages that the device is capable of receiving, minus any coverage exclusions, results in a subset of network coverages known as a "coverage combination" for the subject network device 110.

By way of providing a representative nomenclature, suppose the subject network device 110 is capable of receiving primary network coverages c1, c2, c3 and c4. However, further suppose that coverage c1 is incompatible with coverage c4. In this case, the subject network device 110 will have a coverage combination of C=(c1, c2, c3).

Similarly, of the total possible set of services 180, it may be desirable to test the subject network device 110 for only those services that the device may be capable of processing, as well as those services which may be possible under the previously-determined coverage combination. For example, an interconnect-call-only device may not require testing for dispatch services. Thus, the final list of services the device and capable of, minus any services which fall outside the coverage combination, and further minus any incompatible services, may result in a subset of services referred to as a "service combination" for the subject network device 110.

By way of example, suppose the subject network device 110 is capable of processing primary services s1, s2, s3, s4 and s5, but further suppose that service s1 is incompatible with service s4. Now further suppose that service s1 functions only in coverages c1 and c2, but not in c3. In this case, the subject network device 110 will have a service combination of S1=(s1, s2, s3, s5), as well as a service combination of S2=(s2, s3, s4, s5). That is due to the fact that when the network coverage is either c1 or c2, services s1, s2, s3 and s5 are all possible, but s4 is incompatible with s1 so it is excluded. The second case is based on the fact that coverage c3 is incompatible with s1, so only services s2 and s3 are possible. However, now that there is no conflict with s1, service s4 may be added to the service combination.

Finally, the subject network device 110 may also only be capable of or designed to perform some of the total possible set of device features 170. In addition, the previously-determined service combination may not enable certain features, and some features may or may not be combined with other features. To that end, the final list of primary features the device is capable of, minus any features requiring unavailable services, and further minus any exclusion features, may result in a subset of features referred to as a "feature combination" for the subject network device 110 (e.g., F1=(f1, f2, f3). Here again, the possible permutations grow exponentially based on possible network combinations, service combinations and any exclusions. The individual primary coverages (e.g., c1, c2 and c3), primary services (e.g., s1, s2, s3) and primary features (e.g., f1, f2, f3) which comprise their respective primary combinations may be generically referred to hereafter as "primaries."

For this reason, one aspect of the invention is to enable a device profile to be established for the subject network device 110 based on user-defined values which are representative of the type of device to be tested. For example, a possible device profile may specify a CDMA-only device, running a particular software package, and which is dispatch-capable. Such a device profile may then be used to set the network combination, service combination and feature combination, automatically taking into account known exclusions, incompatibilities between primaries and the like.

While FIGS. 1A-1B make specific reference to the operability testing of cellular-capable devices (e.g., cellular telephones, cellular-capable PDAs, etc.), it should be appreciated by one skilled in the art that the principles of the invention are equally applicable to any network hardware that performs communication transactions (voice/data/videoconferencing/Push-to-Talk(PTT)) on multiple networks using multiple technologies. By way of example, a cellular base station with overlaid networks which is being upgraded to support a new technology (e.g., WIMAX), but which still needs to service legacy technology (e.g., TDMA/CDMA). Similarly, a server which is configured with IP6 capabilities, but which still has to interface with clients capable of only IP4 communication, may be tested in accordance with the principles of the invention. Other network 'devices' which may be similarly tested include a server/host that needs to service higher level client applications (e.g., JAVA), as well as Wireless Application Protocol (WAP) applications; a gateway that allows legacy PTT customers access to PTT services while providing next generation IP-based PTT over cellular (PoC) services to new subscribers; a Voice-Over-Internet-Protocol (VOIP) gateway that has to interface with legacy circuit-switched voice systems; any IP Multimedia Subsystem (IMS) and 3G core network elements that still need to provide circuit-switched data services to legacy customers; and digital telephony interfaces which need to meet the needs of older analog local carriers.

Figure 2:
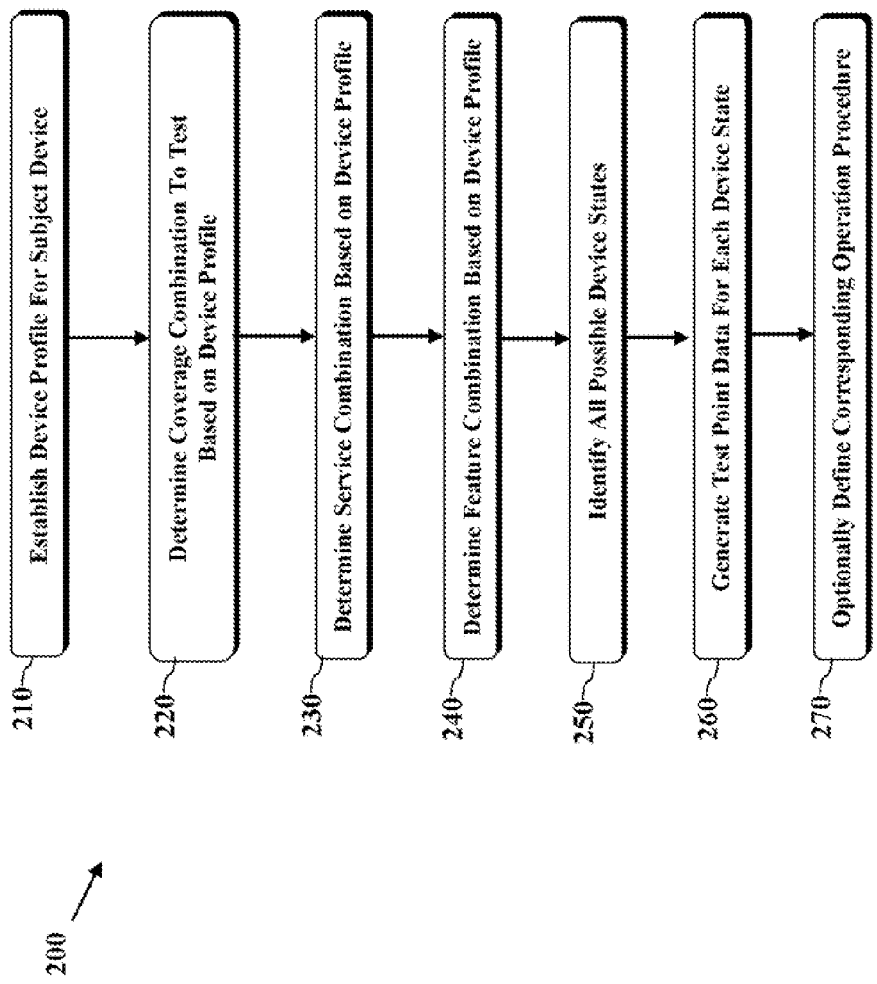
FIG. 2 is a flow diagram for implementing one embodiment of network device operability testing.

Referring now to FIG. 2, depicted is a process 200 for performing network device operability testing in accordance with one embodiment of the invention. In particular, process 200 begins at block 210 where the device profile may be established for a subject device to be tested (e.g., subject network device 110, or any server/gateway/host/router implementing multiple networking technologies). In one embodiment, the device profile may be based on user-provided device specifications. In another embodiment, the device profile may further comprise values representative of the proper operation of the subject device.

Once a device profile has been established, process 200 continues to block 220 where a coverage combination to test is determined based on the given device profile. In one embodiment, the coverage combination is representative of a set of network environments in which the operability of the network device is to be tested. Thereafter, a service combination and feature combination may each be determined at blocks 230 and 240, respectively, again based on the device profile established above at block 210. As with the coverage combination of block 220, the service combination and feature combination may comprise a set of network services and features, respectively, for which the operability of the network device is to be tested.

Process 200 continues to block 250 where a plurality of possible device states corresponding to said coverage combination, service combination and feature combination are identified. As previously described, each device state is a specific combination of a specific network coverage, which is providing a particular service in the implementation of a specific device feature. It should be appreciated that, depending on the coverage, service and feature combinations, the plurality of possible device states may number in the millions.

Once the universe of device states to be tested has been determined, process 200 may continue to block 260 where the actual test point data for each of the plurality of possible device states may be generated. In one embodiment, each such test point may correspond to the subject device's operability at a particular device state. While it should be appreciated that the test point data may be generated by manually placing the subject device in the various device states, in other embodiments any known network connectivity simulation may be similarly used.

Regardless of the means of generation, in one embodiment each such test point may comprise either a positive or negative indication of operability at the corresponding device state. That is, a determination is made at each device state whether the subject device functioned according to a set of specifications. To that end, in one embodiment generating the test point data may further comprise comparing a test result for each of the plurality of possible device states to corresponding threshold values representative of valid device operation. In this fashion, process 200 may be used to perform static operability testing to identify specific points of failure for the subject device.

Process 200 may further include block 270 where operation procedures or instructions may be optionally defined for each of the plurality of possible device states. In one embodiment, such operation procedures may include instructions on how to place the subject device into each of the various device states.

Figure 3:
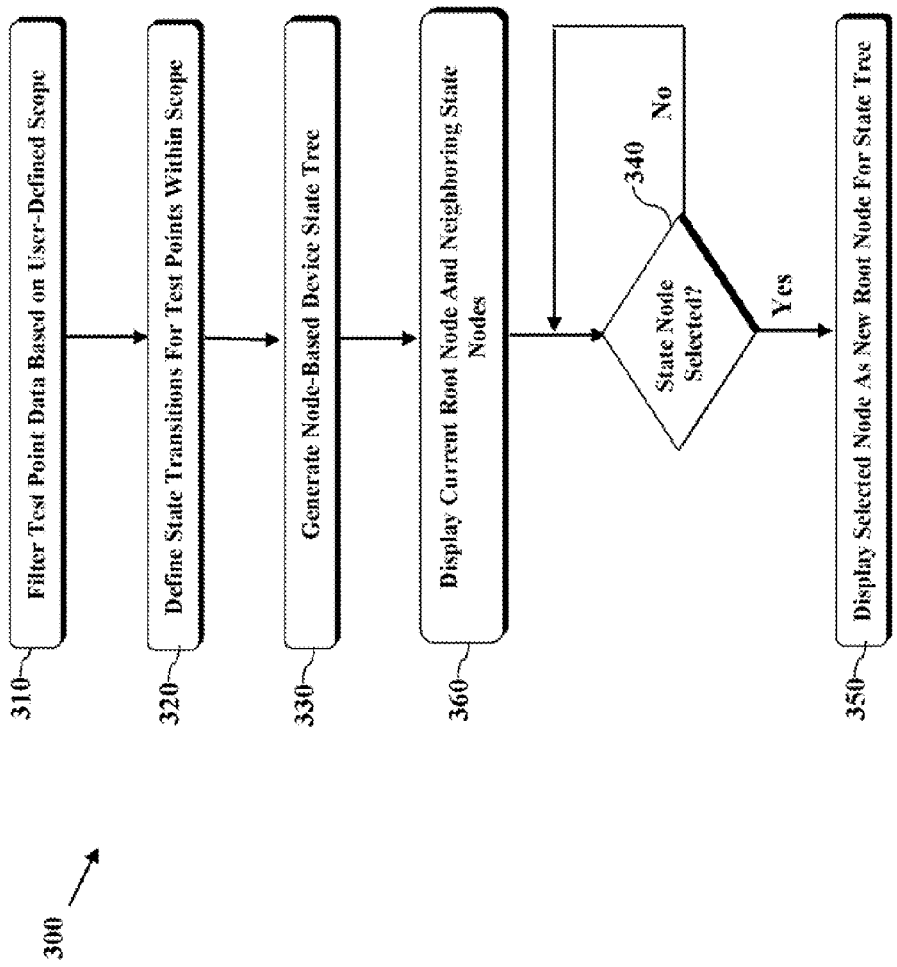
FIG. 3 is a flow diagram for implementing another embodiment of network device operability testing.

Referring now to FIG. 3, depicted is a process 300 for implementing another embodiment of network device operability testing in accordance with at least one aspect of the invention. In particular, the process 300 of FIG. 3 may be performed following the operation of block 260 or 270 of FIG. 2. Alternatively, process 300 may be performed independently thereof.

In any case, process 300 begins at block 310 where test point data (e.g., from block 260 of FIG. 2) may be filtered based on a user-defined test scope. The result of the operation of block 310 may include a select set of test points. By way of example, the user-defined scope may include limiting the test point data to all failures, CDMA-network-related failures, email-related failures, etc. It should generally be appreciated that the possible ways of providing a user-defined test scope at block 310 are virtually limitless. If the network coverages include a network overlay (e.g., EVDO, UMTS, WiMAX, HSDPA, etc.), the user-defined scope may include limiting the test point data to all failures of one of the individual network components which make up the network overlay.

Once the test point data has been narrowed or otherwise filtered to a select set of test points, process 300 may continue to block 320 where state transitions for the select set of test points may be defined. As will be described in more detail below with reference to FIGS. 4 and 5A-5C, such state transitions may be logical representations of the network device moving from one device state to an adjacent device state. In certain embodiments, it may be necessary to identify all of the neighboring states for each test point since state transitions may preferably occur between neighboring device states. Neighboring states may be defined as device states in which only one primary item is changed. Thus, device state A may be connected to device state B by state transition A-B, where device state A and B differ by only one primary—either a network coverage, a service or a feature.

Process 300 continues to block 330 where a node-based device state tree is generated. In one embodiment, the node-based device state tree is a computer-generated graphical representation of the test points from block 310 linked together by the state transitions defined at block 320. To that end, the node-based device state tree generated at block 330 may be comprised of a plurality of nodes connected graphically by a plurality of node links, wherein the plurality of nodes correspond to the select set of test points, and the plurality of node links correspond to the plurality of state transitions defined above at block 320. In certain embodiments, the interconnecting state transitions may be representative of the transition operability testing data for the subject network device. Additional description of an exemplary node-based device state tree is provided below with reference to FIGS. 4 and 5A-5C.

Figure 4:
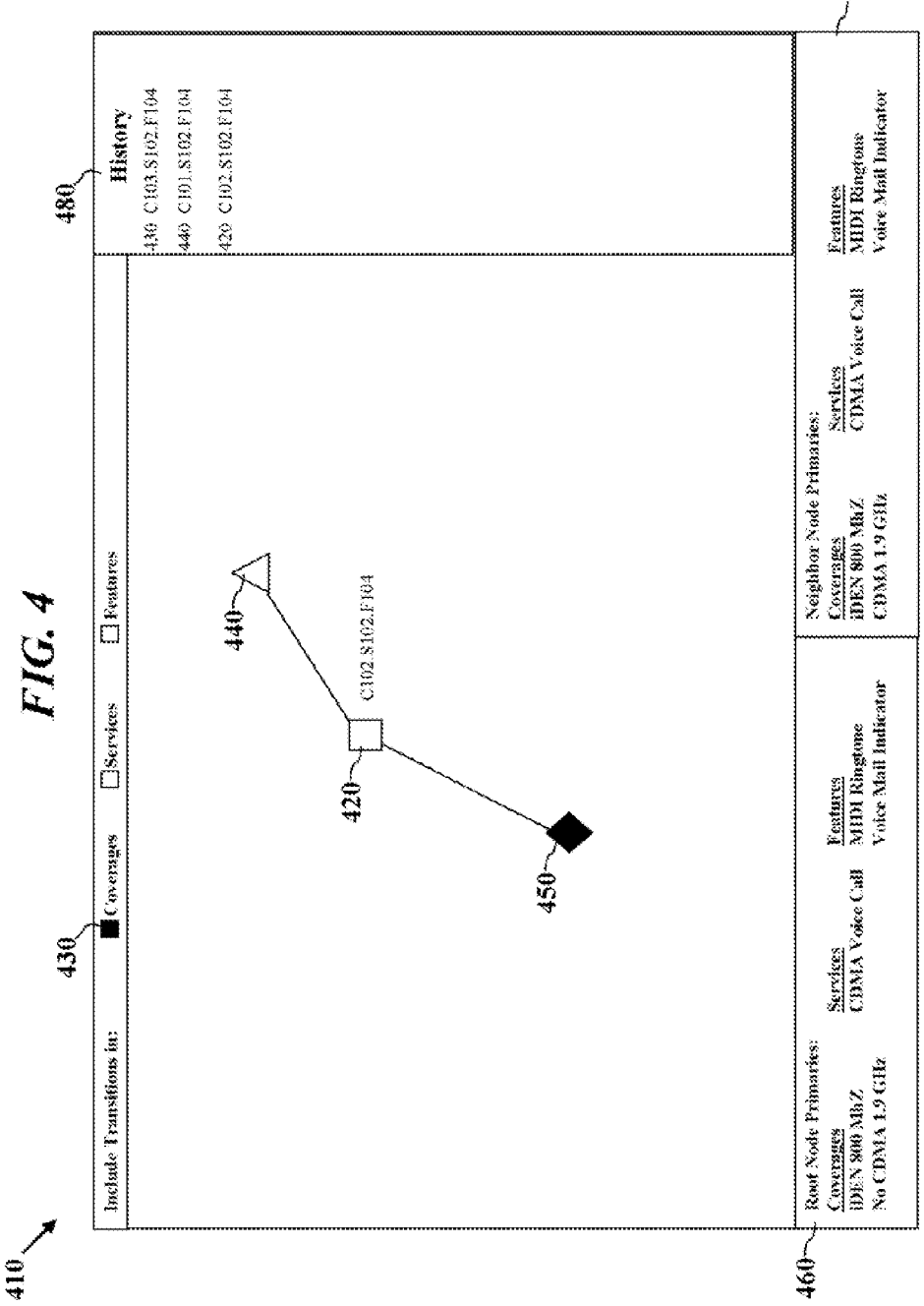
FIG. 4 is a screen shot of a graphical user interface displaying one embodiment of a test point node tree.

Process 300 may move to decision block 340 where the node tree may be displayed to a user on a computer display or similar means (see e.g., FIG. 4). Thereafter, at block 350 a determination may be made as to whether a user has selected one of the state nodes from the device state tree of block 330. In one embodiment, a node may be selected by 'clicking on' or highlighting the node of interest. Numerous other means of selecting a node from the device state node tree are consistent with the principles of the invention.

If no node selection has been made, process 300 may simply loop back through decision block 350 for as long as process 300 is being performed. If, on the other hand, a determination is made at block 350 that a new state node has been selected, process 300 may continue to block 360 where the newly selected node may be re-defined as the new root node for the device state tree. Corresponding adjacent nodes and node links may then be updated to reflect the new root node's transitions and adjacent nodes.

By way of a non-limiting example, FIG. 4 depicts a graphical user interface (GUI) 410 displaying one embodiment of a simplified test point node tree. As shown, the GUI 410 includes a root node (or test point) 420 which is defined in terms of its underlying coverage, service and feature combination (i.e., C102.S102.F104). In the embodiment of FIG. 3, the test point data scope has been user-defined to include network coverage transitions by checking box 430. (e.g., operation of block 310 of FIG. 3). Accordingly, the root node 420 has two adjacent nodes 430 and 440 connected to the root node 420 by coverage transitions (e.g., operation of block 320 of FIG. 3). In addition, root node information area 460 may be used to provide the user with primary information for the root node. Similarly, neighbor node information area 470 may contain primary information for neighbor node(s). Since the depicted device state tree contains coverage transitions only, a comparison of area 460 and 470 shows the single primary change between the adjacent nodes as being "CDMA 1.9 GHz" coverage or "No CDMA 1.9 GHz" coverage.

Continuing to refer to FIG. 4, root node history 480 may be used to track the various node selected and corresponding root node changes. To that end, a user may quickly determine the primary changes between the current root node 420 (i.e., C102) and its adjacent nodes 440 and 450 (i.e., C101 and C103, respectively).

Finally, since the device nodes are representative of the test point data for the underlying device states, in certain embodiments it may further be preferable to provide an indication of whether the test point data underlying the displayed nodes indicates either a positive or negative test result. To that end, while nodes 420 and 440 indicate positive test results, the black-filled node 450 may be indicative of the fact that the particular device state associated with node 450 failed the operability test. Similarly, the links between the various device nodes may be representative of transition operability testing data, where each link is may be representative of the device's operability as it undergoes the state change between the nodes defining the transition. Since the test data underlying adjacent nodes may have only one degree of freedom (e.g., only one primary is changing), a user may efficiently pinpoint the exact nature and cause of any device operability failure, as well as any failures associated with transitioning from one state to another.

Figure 5A:
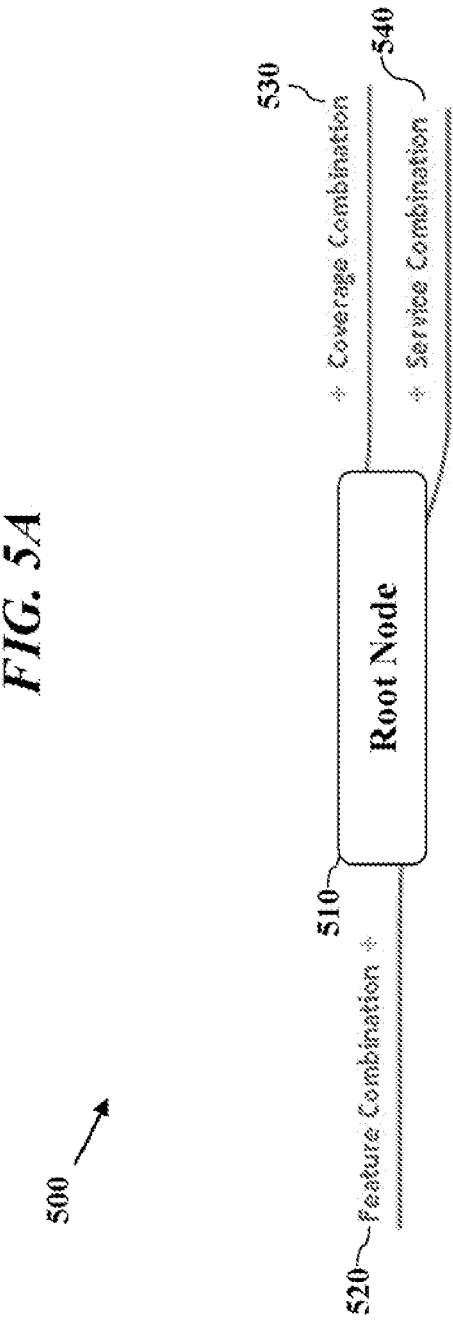
FIGS. 5A-5C depicts test point node tree structures consistent with one or more embodiments of the invention.
Figure 5B:
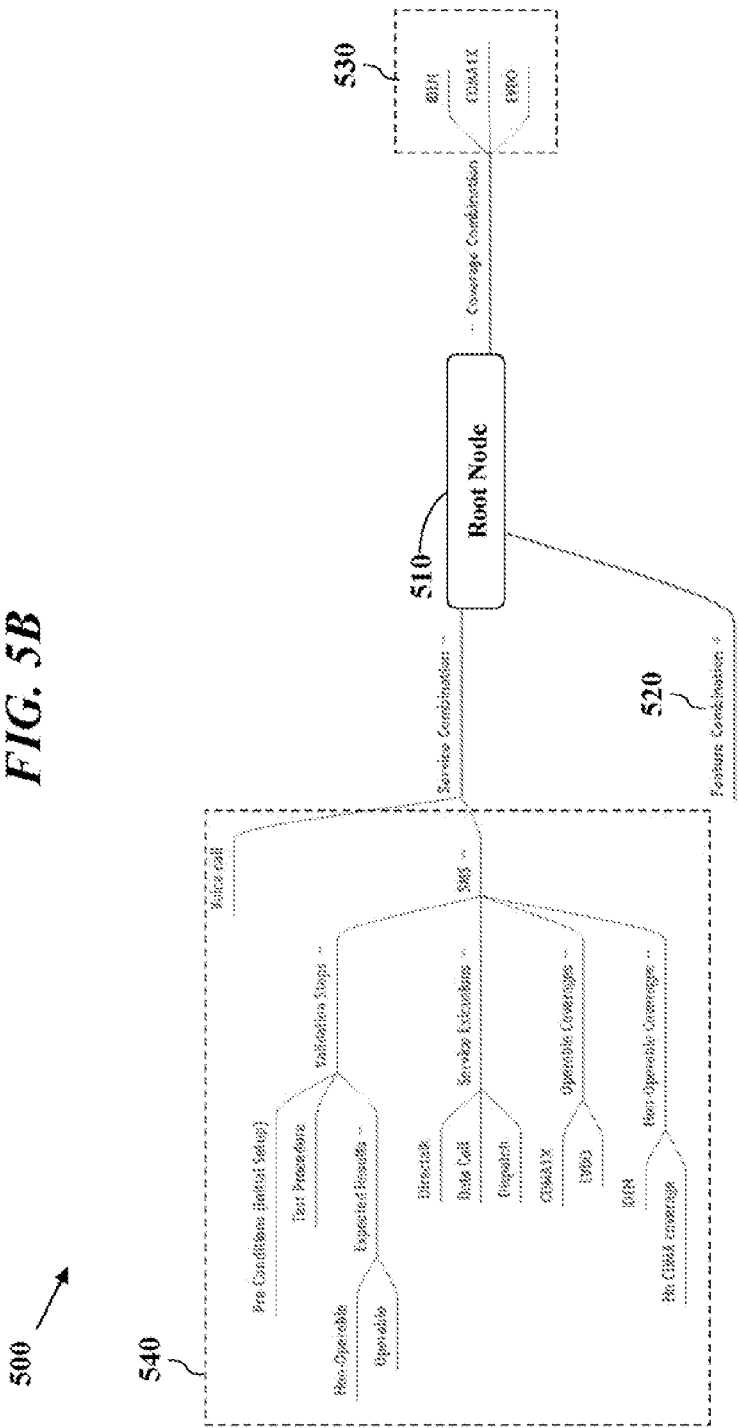
Figure 5C:
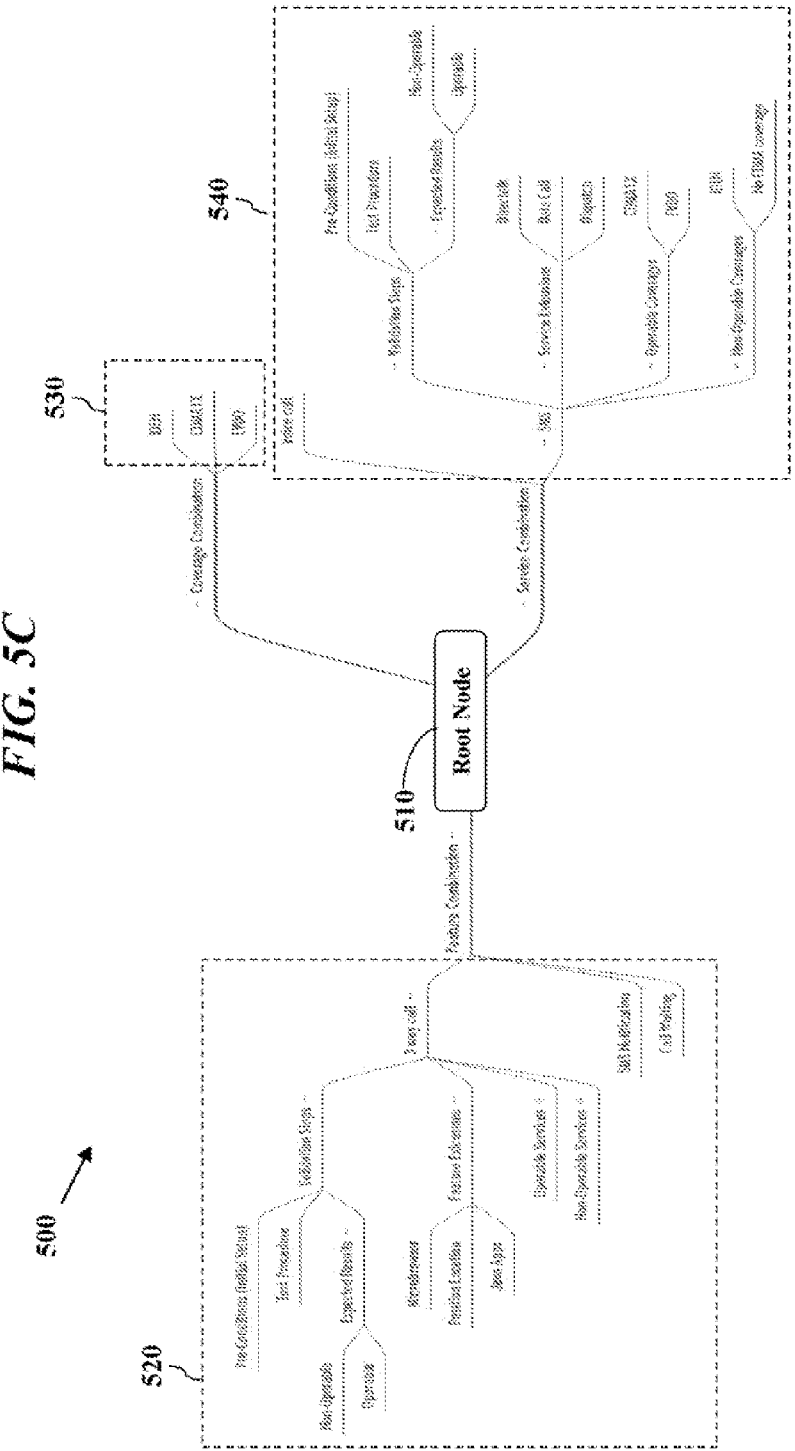

Referring now to FIGS. 5A-5C, depicted are test point node tree structures consistent with one or more embodiments of the invention. Rather than the limited filtering options presented above with reference to GUI 410 of FIG. 4, another aspect of the invention is to provide a comprehensive node tree 500 which includes a root node 510 with neighboring feature combinations 520, coverage combinations 530 and service combinations 540 depicted in a collapsed view. In this fashion, a user may navigate specific test point data on a network-, service- and/or feature-specific basis. For example, FIG. 5B depicts another embodiment of the node tree 500 after the service combination 540 and the network combination 530 have been expanded. From this, a user may select individual service nodes from the expanded service combination 540, or individual network nodes from the expanded network combination 530. Moreover, with reference to the expanded service combination 540, a user may select to view test point data for non-operable versus operable validation, as applied to specific operable or non-operable network environments.

FIG. 5C further depicts node tree 500 device states with the feature combination 520 also in expanded view. From this architecture, a user may quickly and efficiently choose to view underlying device states and corresponding test point data for features with were operable or non-operable, associated procedures, excluded features, features as a function of operable or non-operable services, etc. It should be appreciated that there are virtually limitless possible variations on device state node tree 500 that are all consistent with the principles of the invention. It should further be appreciated that the links interconnecting the various nodes of node tree 500 may be representative of the transition operability testing results. Thus, node tree 500 may present both static as well as transition operability testing data to the user in an integrated graphical representation.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for network device operability testing comprising:
    establishing a device profile for a network device;
    determining a coverage combination, a service combination and a feature combination for the network device based on the device profile,
    wherein the coverage combination comprises a plurality of network coverages which the network device is capable of receiving minus incompatible network coverages,
    wherein the service combination comprises services that the network device is capable of minus services not within the coverage combination and services of one network coverage incompatible with another network coverage, and
    wherein the feature combination is features of the network device minus features requiring services unavailable in the coverage combination;
    identifying a plurality of possible device states corresponding to said coverage combination, service combination and feature combination; and
    generating test point data for each of said plurality of possible device states.

2. The method of claim 1, wherein the coverage combination comprises a set of network environments in which the operability of said network device is to be tested.

3. The method of claim 1, wherein the service combination comprises a set of network services for which the operability of said network device is to be tested, wherein said set of network services includes at least one of telephony services, mobility management events, emergency/non-emergency location-based services, push-to-talk, games, selective dynamic group calling, streaming media, over-the-air software and firmware updates and desktop synchronization.

4. The method of claim 1, wherein the feature combination comprises a set of features for which the operability in said network device is to be tested, wherein said set of features includes at least one of browser feature, a chat feature, an email feature, a personal information management feature, personal information management application, media player/downloader, picture/video capture and phone-as-modem client.

5. The method of claim 1, further comprising:
    defining a plurality of operation procedures for said network device, wherein said plurality of operation procedures are usable to cause said network device to enter said plurality of possible device states, and associating each of said plurality of operation procedures with a corresponding one of said plurality of possible device states.

6. The method of claim 1, further comprising filtering said test point data based on a user-defined test scope to identify a select set of test points.

7. The method of claim 6, further comprising defining a plurality of state transitions for said select set of test points, each of said plurality of state transitions being representative of operability testing data corresponding to the network device transitioning from one device state to an adjacent device state.

8. The method of claim 7, further comprising generating a node-based device state tree comprising a plurality of nodes connected graphically by a plurality of node links, wherein said plurality of nodes correspond to said select set of test points, and said plurality of node links correspond to said plurality of state transitions.

9. The method of claim 7, wherein the adjacent device state is characterized by a change in only one of the coverage combination, the service combination and the feature combination.

10. The method of claim 1, wherein generating the test point data further comprises comparing a test result for each of the plurality of possible device states to corresponding threshold values representative of valid device operation.

11. The method of claim 1, wherein the network device is one of a cellular-capable electronic device, a network server, a network router and a network gateway.

12. A computer program product, comprising:
a processor readable medium having processor executable code embodied therein to perform network device operability testing, the processor readable medium having:
processor executable program code to establish a device profile for a network device,
processor executable program code to determine a coverage combination, a service combination and a feature combination for the network device based on the device profile,
wherein the coverage combination comprises a plurality of network coverages which the network device is capable of receiving minus incompatible network coverages,
wherein the service combination comprises services that the network device is capable of minus services not within the coverage combination and services of one network coverage incompatible with another network coverage, and
wherein the feature combination is features of the network device minus features requiring services unavailable in the coverage combination,
processor executable program code to identify a plurality of possible device states corresponding to said coverage combination, service combination and feature combination, and
processor executable program code to generate test point data for each of said plurality of possible device states.

13. The computer program product of claim 12, wherein the coverage combination comprises a set of network environments in which the operability of said network device is to be tested.

14. The computer program product of claim 12, wherein the service combination comprises a set of network services for which the operability of said network device is to be tested, and wherein said set of network services includes at least one of telephony services, mobility management events, emergency/nonemergency location-based services, push-to-talk, games, selective dynamic group calling, streaming media, over-the-air software and firmware updates and desktop synchronization.

15. The computer program product of claim 12, wherein the feature combination comprises a set of features for which the operability in said network device is to be tested, and wherein said set of features includes at least one of browser feature, a chat feature, an email feature, a personal information management feature, personal information management application, media player/downloader, picture/video capture and phone-as-modem client.

16. The computer program product of claim 12, wherein the processor readable medium further includes:
processor executable program code to define a plurality of operation procedures for said network device, wherein said plurality of operation procedures are usable to cause said network device to enter said plurality of possible device states; and
processor executable program code to associate each of said plurality of operation procedures with a corresponding one of said plurality of possible device states.

17. The computer program product of claim 12, wherein the processor readable medium further includes processor executable program code to filter said test point data based on a user-defined test scope to identify a select set of test points.

18. The computer program product of claim 17, wherein the processor readable medium further includes processor executable program code to define a plurality of state transitions for said select set of test points, each of said plurality of state transitions being representative of operability testing data corresponding to the network device transitioning from one device state to an adjacent device state.

19. The computer program product of claim 18, wherein the processor readable medium further includes processor executable program code to generate a node-based device state tree comprising a plurality of nodes connected graphically by a plurality of node links, wherein said plurality of nodes correspond to said select set of test points, and said plurality of node links correspond to said plurality of state transitions.

20. The computer program product of claim 18, wherein the adjacent device state is characterized by a change in only one of the coverage combination, the service combination and the feature combination.

21. The computer program product of claim 12, wherein the processor executable program code to generate the test point data further comprises processor executable program code to compare a test result for each of the plurality of possible device states to corresponding threshold values representative of valid device operation.

22. The computer program product of claim 12, wherein the network device is one of a cellular-capable electronic device, a network server, a network router and a network gateway.

23. A method for network device operability testing comprising:
establishing a device profile for a network device;
determining a coverage combination, a service combination and a feature combination for the network device based on the device profile,
wherein the coverage combination comprises a plurality of network coverages which the network device is capable of receiving minus incompatible network coverages,
wherein the service combination comprises services that the network device is capable of minus services not within the coverage combination and services of one network coverage incompatible with another network coverage, and wherein the feature combination is features of the network device minus features requiring services unavailable in the coverage combination;

identifying a plurality of possible device states corresponding to said coverage combination, service combination and feature combination;

generating test point data for each of said plurality of possible device states;

defining a plurality of state transitions for the plurality of possible device states, wherein each of said plurality of state transitions is representative of the network device moving from one device state to an adjacent device state; and generating a node-based device state tree comprising a plurality of nodes connected graphically by a plurality of node links, wherein said plurality of nodes correspond to said plurality of possible device states, and said plurality of node links correspond to said plurality of state transitions.

24. The method of claim 23, wherein the coverage combination comprises a set of network environments in which the operability of said network device is to be tested.

25. The method of claim 23, wherein the service combination comprises a set of network services for which the operability of said network device is to be tested, and wherein said set of network services includes at least one of telephony services, mobility management events, emergency/non-emergency location-based services, push-to-talk, games, selective dynamic group calling, streaming media, over-the-air software and firmware updates and desktop synchronization.

26. The method of claim 23, wherein the feature combination comprises a set of device features for which the operability in said network device is to be tested, wherein said set of features includes at least one of browser feature, a chat feature, an email feature, a personal information management feature, personal information management application, media player/downloader, picture/video capture and phone-as-modem client.

27. The method of claim 23, further comprising:

defining a plurality of operation procedures for said network device, wherein said plurality of operation procedures are usable to cause said network device to enter said plurality of possible device states; and associating each of said plurality of operation procedures with a corresponding one of said plurality of possible device states.

28. The method of claim 23, further comprising filtering said test point data based on a user-defined test scope to identify a select set of test points.

29. The method of claim 23, wherein the adjacent device state is characterized by a change in only one of the coverage combination, the service combination and the feature combination.

30. The method of claim 23, wherein generating test point data further comprises comparing a test result for each of the plurality of possible device states to corresponding threshold values representative of valid device operation.

31. The method of claim 23, wherein the network device is one of a cellular-capable electronic device, a network server, a network router and a network gateway.

* * * * *